United States Patent [19]

Salon

[11] 4,128,779
[45] Dec. 5, 1978

[54] STRANDED CONDUCTOR FOR DYNAMOELECTRIC MACHINES

[75] Inventor: Sheppard J. Salon, Pittsburgh, Pa.

[73] Assignee: Westinghouse Electric Corp., Pittsburgh, Pa.

[21] Appl. No.: 784,753

[22] Filed: Apr. 5, 1977

[51] Int. Cl.² .............................................. H02K 3/14
[52] U.S. Cl. ...................................... 310/213; 174/34
[58] Field of Search ...................... 310/213; 174/34; 336/187

[56] References Cited

U.S. PATENT DOCUMENTS

| Re. 27,489 | 9/1972 | Brenner | 310/213 |
| 2,896,102 | 7/1959 | Bucklew | 310/213 |
| 3,188,377 | 6/1965 | Hughes | 310/213 |
| 3,280,244 | 10/1966 | Pannen | 174/34 |
| 3,381,154 | 4/1968 | Madsen | 310/213 |
| 3,647,932 | 3/1972 | Heller | 310/213 |

FOREIGN PATENT DOCUMENTS

| 1169012 | 12/1958 | France | 310/213 |
| 625452 | 9/1961 | Italy | 336/187 |

Primary Examiner—R. Skudy
Attorney, Agent, or Firm—G. H. Telfer

[57] ABSTRACT

A winding conductor is provided for large dynamoelectric machines, such as turbine generators, consisting of two parallel bars each comprising two stacks of strands transposed between the stacks. The radial flux in the machine causes circulating currents with unequal distribution of current between the two parallel bars of such a conductor, causing excessive heating in one of the bars. The two bars of each conductor are, therefore, made of different cross-sectional areas substantially proportional to the different currents, so that in normal operation, the current density is the same in both bars and overheating is prevented.

3 Claims, 3 Drawing Figures

U.S. Patent Dec. 5, 1978 4,128,779
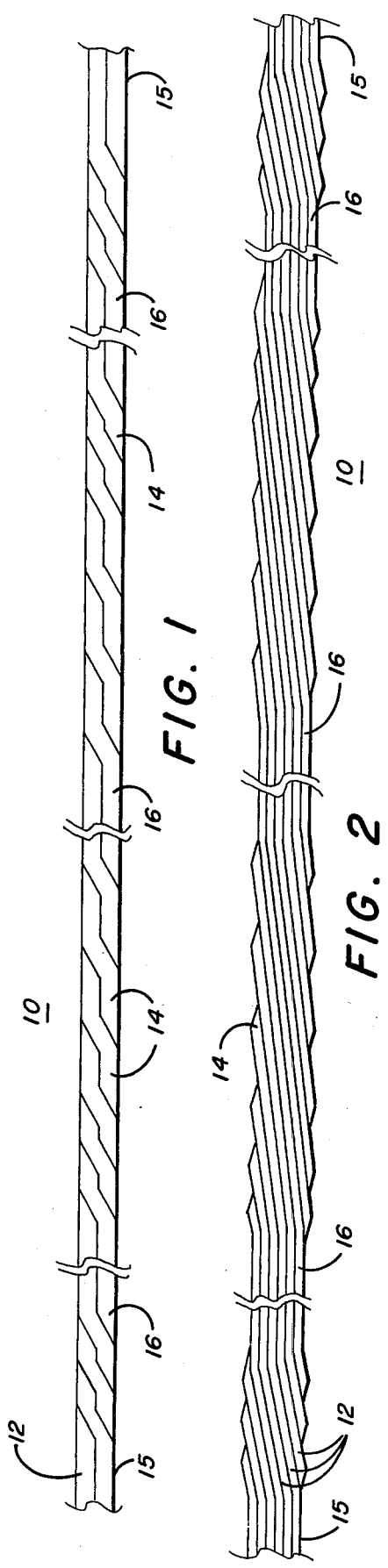
FIG. 1
FIG. 2
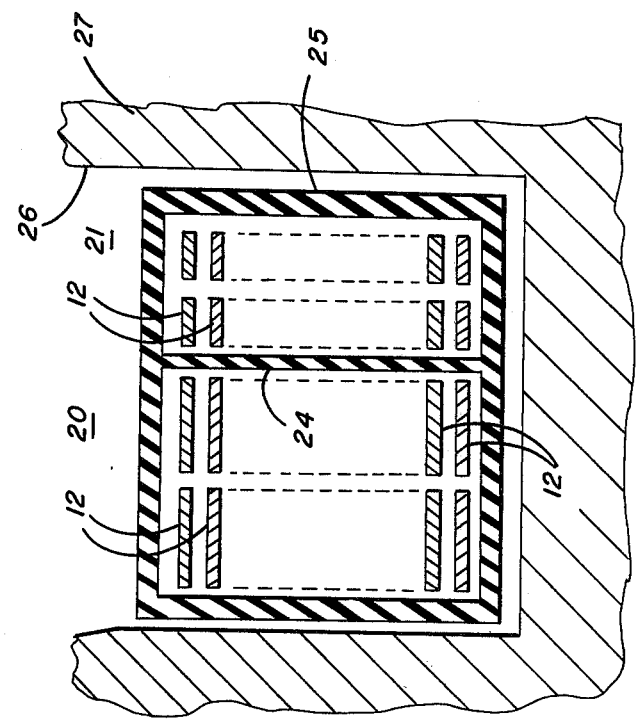
FIG. 3

STRANDED CONDUCTOR FOR DYNAMOELECTRIC MACHINES

BACKGROUND OF THE INVENTION

The present invention relates to a winding conductor for dynamoelectric machines, and more particularly to a transposed, stranded conductor of high current capacity for use as a winding conductor or half-coil for machines of large size, such as turbine generators.

The winding conductors of large dynamoelectric machines, such as turbine generators, are placed in slots in a laminated magnetic stator core. Each conductor, or half-coil, has a straight portion disposed in the slot and end portions which extend around the circumference of the core for connection to other conductors lying in different slots to form complete coils. The magnetic fluxes which occur across the slots cause induced voltages and eddy currents in the conductors, and for this reason the conductors of large machines are always of stranded construction, being built up of a substantial number of relatively thin strands to minimize the eddy current loss. Since the fluxes vary radially, the induced strand voltages vary throughout the slot so that circulating currents can occur because of the unbalanced voltages. For this reason, it is necessary to transpose the strands to cancel out as far as possible the unbalanced strand voltages to minimize circulating currents and the resultant heating.

The most usual type of transposition which has been used for many years is the Roebel transposition. In this arrangement, as shown in Roebel U.S. Pat. No. 1,144,252, the strands are disposed in two side-by-side stacks and transposed within the slot by crossovers between the stacks. That is, the strands are inclined in each stack so that each strand moves radially to the top or bottom of the stack, crosses over to the other stack, moves radially through the stack, and crosses over back to the first stack. Thus, looking at the end of the conductor, each strand moves through an angle of 360° in going from one end of the slot to the other, and emerges in the same relative position at which it entered the slot. Each strand, therefore, occupies all positions in the slot for equal distances and the induced strand voltages are exactly balanced within the slot. Induced strand voltages also occur in the strands in the end portions of the conductor outside the slot, however, and in the usual practice these have been taken care of by the group transpositions between groups of strands at the connections between the ends of adjacent conductors, so that these voltages are balanced out within a complete coil or group of coils.

The Roebel transposition with group transpositions between conductors is very satisfactory where the strands are insulated from each other throughout each coil or group of coils. In many cases, however, especially in machines of large size, it is necessary or desirable to solidly join the strands together at each end of a single conductor or half-coil, as in liquid-cooled machines where water or other liquid coolant must be circulated through each conductor from one end to the other, or in cases where the currents to be carried are large enough to require more than two stacks of strands. In such cases, where group transpositions cannot be made, the induced strand voltages in the end portions must be taken care of in other ways. One way of doing this is by means of a 540° transposition within the slot, as shown in Ringland U.S. Pat. No. 2,281,641, which results in inverting the strands in the two end portions with respect to each other to effect at least partial cancellation of the end portion strand voltages. A more effective construction which substantially completely eliminates circulating currents due to unbalanced strand voltages is shown in Brenner U.S. Pat. Re. No. 27,489. In this arrangement, the strands are transposed through 540° in the slot and voids or untransposed sections of suitable length are interposed at proper points in the conductor so that unbalanced strand voltages occur within the slot which balance out the strand voltages in the end portion.

As mentioned above, in many cases it is necessary to provide four stacks of strands to carry the high load currents involved in modern machines of large size. The conventional way of doing this is to place two standard Roebel bars in parallel in each slot, and if the strands are insulated from each other throughout the complete coil, this is entirely satisfactory. In cases such as those mentioned above, however, where the strands are shorted together at each end of each conductor, this arrangement is not satisfactory. It might appear that if four stacks of strands are needed, two 540° bars as discussed above could be placed side-by-side and joined together at both ends. In actual practice, however, it is found that the radial fluxes in the machine are such that voltages are induced, especially in the end portions of the conductors, which cause circulating currents to flow between the two paralleled bars which are superimposed on the normal load current. These circulating currents are large enough to cause seriously unequal distribution of the total current, so that one of the parallel bars carries a considerably larger current than the other, and can seriously overheat because of the greatly increased losses as compared to the other bar.

One way of dealing with this situation is, of course, to increase the cooling of at least the bar with the greater current, and this has been done by increasing the pressure of the coolant water which circulates through the bar to increase the flow and thus remove the additional heat. This is not a satisfactory solution, however, since the maximum permissible pressure of the water must be less than the hydrogen pressure in the machine to prevent leakage of water into the machine in case of a leak in the coolant system. It has also been proposed to overcome this problem by transposition schemes, such as that of Pannen U.S. Pat. No. 3,280,244 where two central stacks of strands are transposed in the usual manner and two outside stacks of strands are transposed around the first two in a concentric arrangement, or by the four stack transposition of Heller et al U.S. Pat. No. 3,647,932 in which the strands are transposed through all four stacks of strands. These arrangements, however are difficult and expensive to manufacture and are undesirable for that reason.

SUMMARY OF THE INVENTION

In accordance with the present invention, a winding conductor is provided for large dynamoelectric machines which utilizes two stranded and transposed conductor bars arranged in parallel in the slot and connected together at the ends. The voltages induced by radial fluxes result in a seriously unequal distribution of current between the two bars, as discussed above, but the adverse thermal effects of this unequal current distribution are eliminated by making the two bars of unequal cross-sectional area. That is, one bar is of greater transverse width than the other bar so that the total cross-sectional areas of copper in the two bars are not equal and are substantially proportional to the currents flowing in the bars. Thus, during operation, the current is unequally divided between the two bars of each conductor but because of the difference in area, the current density is essentially the same in both bars. More heat is generated in one bar than in the other but it is distributed throughout a greater volume of copper, so that the temperature rise is kept the same in both bars and the normal cooling means can be used. The increased cross-sectional area of one bar relative to the other is easily provided by using wider strands in one bar than in the other so that the total cross-section of copper in each bar meets the requirement indicated above.

BRIEF DESCRIPTION OF THE DRAWINGS

The invention will be more fully understood from the following detailed description, taken in connection with the accompanying drawings, in which:

FIGS. 1 and 2 are a top view and a side view, respectively, of a single transposed conductor bar; and FIG. 3 is a transverse sectional view of a complete conductor embodying the present invention.

DESCRIPTION OF THE PREFERRED EMBODIMENT

As previously discussed, the invention relates in particular to winding conductors for turbine generators of large size where the load currents to be carried are such that four stacks of strands are required. Two conductor bars with two stacks of strands in each bar are used for this purpose, but when two such bars are paralleled, the circulating currents cause serious overheating of one bar even when 540° transpositions are used. This is due to the radial fluxes in the machine which cause unbalanced voltages between the two bars such that very large circulating currents flow between the bars and are superimposed on the normal load current. These circulating currents can be of the order of 20% to 30% of the maximum load current and typically result in a distribution of the total current between the two bars such that one bar carries 60% of the current and the other bar only 40%.

As previously discussed, each of the conductor bars is made up of two stacks of strands which are transposed between the stacks, and where the conductors are solidly connected together at both ends so that all stacks of strands in both bars are in parallel, as in liquid-cooled machines, it is preferred to use transposed conductor bars 10 of the type shown in the above-mentioned Brenner patent. As shown in FIGS. 1 and 2, such a conductor bar consists of a plurality of relatively thin strands 12 arranged in two side-by-side stacks, at least some of the strands being hollow for circulation of liquid coolant, or other known cooling means being provided. Six strands are shown in the drawing in each stack for the purpose of illustration, although it will be understood that in an actual conductor, a much larger number of strands is normally used. The strands 12 are transposed between stacks in a manner generally similar to the conventional Roebel transposition by crossovers indicated at 14. The strands are, however, transposed through 540°, that is, the strands are transposed through 180° in the first one-fourth of the slot length of the bar, through another 180° in the second and third quarter length of the bar, and another 180° in the fourth quarter of the bar length, the crossover spacing being adjusted as necessary in the different sections of the bar. The strands in the end portions 15 at opposite ends, therefore, are inverted in relative position to at least partially cancel the unbalanced end portion voltages. In addition, untransposed sections 16 of suitable length are provided at appropriate points within the slot portion of the bar, as more fully explained in the Brenner patent, to obtain substantially complete compensation of induced strand voltages. While this is the preferred type of conductor bar, it will be understood that the invention is not limited to this particular arrangement, and that any suitable stranded and transposed conductor bar could be used which is suitable for connection in parallel with another similar bar.

Where four stacks of strands are required to carry the load current, two stranded bars, such as those of FIGS. 1 and 2, have been placed side-by-side and connected together at the ends to form a winding conductor. In this conventional arrangement of two identical bars disposed physically and electrically in parallel, however, large circulating currents flow between the bars due to the radial flux, as previously explained, such that in a typical case, one bar may carry 60% of the total current while the other is carrying only 40%. This results in serious overheating of the one bar. Thus, if A is the total cross-sectional area of copper in each of the two bars of the conductor, the resistance R per unit length is $\rho/A$ where $\rho$ is the resistivity. If the total current divided equally between the two paralleled bars, so that each bar carried a current I of 0.5 per unit, the total loss W per unit length would be:

$$W = 2I^2R = (0.5)^2 \rho/A + (0.5)^2 \rho/A = (2 \times 0.25)$$
$$\rho/A = 0.5R$$

If the current divides in the ratio of 60 to 40 as described above, however, the loss becomes:

$$W = I_1^2 R + I_2^2 R = 0.36R + 0.16R = 0.52R$$

It will be noted that the unequal division of current results in a 4% increase in the total copper loss in the conductor. The more serious effect, however, is the fact that the loss in one conductor bar has increased from 0.25R to 0.36R which represents a 44% increase in the heat generated in this bar. Such a large increase in heat would result in serious overheating unless some means is provided for effectively dissipating the excess heat. As previously mentioned, it has been attempted to do this by increasing the flow of coolant but this is not a satisfactory solution and when the coolant is water, the increased flow that can be obtained by increasing the pressure is limited by the necessity of keeping the water pressure below the hydrogen pressure in the machine.

In accordance with the present invention, this problem is overcome by the use of a non-symmetrical conductor consisting of two parallel bars 20 and 21 as shown in FIG. 3. These bars are similar to the bars 10 of FIGS. 1 and 2, and each bar consists of a plurality of strands 12 disposed in two stacks and transposed from stack-to-stack as previously described. The two bars 20 and 21 are arranged side-by-side and insulated from each other as indicated at 24. The complete conductor is enclosed in the usual high voltage ground insulation 25. The conductor thus consists of two stranded bars disposed physically and electrically in parallel. The conductor is intended to be placed in a slot 26 in the stator core 27 of a large generator. In accordance with the present invention, the two bars 20 and 21 of each conductor are different in size. That is the total cross-sectional area of copper is different in the two bars, and preferably is made substantially proportional to the expected current in each bar. Thus, if the division of current between the two bars is in the ratio of 60:40, as discussed above, then the total copper cross-sectional area is also in the ratio of 60:40 as illustrated in FIG. 3.

The effect of this may be seen as follows, utilizing the subscripts 1 and 2 for the bars 20 and 21, respectively. If A is the cross-sectional area of each of two identical bars 10 in the conventional construction discussed above, then the areas of the bars 20 and 21 of FIG. 3 will be $A_1 = 1.2A$ and $A_2 = 0.8A$. The total loss in the conductor is then:

$$W = \frac{(0.6)^2 \rho}{A_1} + \frac{(0.4)^2 \rho}{A_2}$$
$$= 0.36R_1 + 0.16R_2$$

The total loss therefore is the same as in the conventional arrangement. In considering the thermal effects, however, the current density must be considered. The current densities in the two bars 20 and 21 are as follows:

$$J_2 = \frac{0.6\rho}{1.2A} = 0.5R$$

$$J_2 = \frac{0.4\rho}{0.8A} = 0.5R$$

Thus, the current densities, on a per unit basis, are the same in both bars and the same as the current density in a conventional two-bar conductor. Even though the actual currents are different and more heat is generated in bar 20 than in bar 21, the current density is the same and the heat generated per unit volume of copper, therefore, is the same in both bars. For this reason, the temperature rise is the same in both bars and the cooling problem is no more serious than with conventional conductors. The coolant flow therefore does not need to be increased since the heat generated is not concentrated to any greater extent in one bar than in the other.

The increased copper cross-section of one bar as compared to the other can be obtained in any desired manner in designing the bar. It is preferred as shown in FIG. 3 to use wider strands in the bar 20 than in the bar 21, the thickness of the strands remaining the same so that the same number of strands can be used in both bars and both stacks are of the same height. This may slightly increase the local eddy current loss due to radial flux in the top few strands of the bar 20, but this is a very small effect which does not seriously affect the cooling. It will be seen, therefore, that a conductor has been provided having four stacks of strands but without the serious heating problem which results from merely paralleling two identical conventional conductor bars.

What is claimed is:

1. A winding conductor for a dynamoelectric machine, said conductor comprising two bars disposed physically and electrically in parallel, each of said bars consisting of a plurality of insulated strands disposed in two side-by-side stacks and transposed between stacks, said bars being subject to unequal division of current between them during operation of the machine, and the cross-sectional areas of the two bars being different such that the current density is substantially the same in both bars.

2. A winding conductor as defined in claim 1 in which the cross-sectional areas of the two bars are substantially proportional to the magnitudes of the currents in the bars.

3. A winding conductor as defined in claim 2 in which the strands of one bar are wider than the strands of the other bar.

* * * * *